United States Patent

[11] 3,589,583

[72] Inventor Stanley D. Tout
Arcadia, Calif.

[21] Appl. No. 822,937
[22] Filed May 8, 1969
[45] Patented June 29, 1971
[73] Assignee Bell & Howell Company
Chicago, Ill.

[54] MECHANICAL RELAY APPARATUS
13 Claims, 4 Drawing Figs.

[52] U.S. Cl. .......... 226/176, 226/187, 226/194, 74/211
[51] Int. Cl. .......... G11b 15/29
[50] Field of Search .......... 226/176, 177, 194, 186, 187; 74/211

[56] References Cited

UNITED STATES PATENTS

| | | | |
|---|---|---|---|
| 3,148,819 | 9/1964 | Frick et al. .......... | 226/176 |
| 3,353,733 | 11/1967 | Fieldgate .......... | 226/176 |
| 3,490,669 | 1/1970 | Watson .......... | 226/176 |

*Primary Examiner*—Allen N. Knowles
*Attorney*—David Weiss

ABSTRACT: A mechanical relay apparatus, in combination with a rotating drive means preferably supplied by a web transport system, for switching a cooperative device from a first configuration to a second configuration and for maintaining the device in the second configuration until a resetting force is applied to the relay apparatus.

Stanley D. Tout,
INVENTOR.
BY.

ATTORNEY.

Stanley D. Trout,
INVENTOR.
BY.
David Weiss
ATTORNEY.

MECHANICAL RELAY APPARATUS

BACKGROUND OF THE INVENTION

1. Field of the Invention

This invention relates to relay apparatus, and more particularly to mechanical relay apparatus powered by a rotating drive means supplied by a web transport system.

2. Description of the Prior Art

In conventional web transport systems including continuously rotating drive means, the web is generally caused to be controllably transported by means of cooperative mechanical devices which must be switched from one mechanical configuration to a second configuration at selected times. Such devices, for example, include means for causing the web to alternatively engage and disengage the drive means for being transported at a controlled speed and for stopping transport, respectively, and means for causing reversal of web transport for web rewind.

In one type of web transport system, conventionally used in information recording and playback apparatus such as magnetic tape recording and/or playback machines, the tape is pressed against a continuously driven capstan by means of an idler or "pinch" roller during tape transport, and the pinch roller is retracted therefrom for interrupting tape transport. Prior art apparatus for moving the pinch roller with respect to the capstan generally includes electromechanical means, such as electromechanical relay, for urging the pinch roller (against a spring force normally biasing the pinch roller in engagement with the capstan) away from the capstan, or alternatively for urging the pinch roller (against a spring force normally biasing the pinch roller to disengaged from the capstan) toward the capstan for engagement therewith. In either case, the repositioning of the pinch roller proceeds upon electrical energization or deenergization of a solenoid. Similarly, other tape transport functions (such as tape rewind) are solenoid controlled.

The expense involved in the utilization of electromechanical relay apparatus for performing these switching functions is often significantly disproportionate to the total cost of many tape recorder and/or playback systems. Furthermore, for battery operated systems, solenoid energization provides an additional source of battery drain.

SUMMARY OF THE INVENTION

The present invention comprises an expensive mechanical relay apparatus for combination with a rotating drive means supplied by a web transport system, for switching a cooperative device from a first configuration or position to a second position and for maintaining the device in the second position until a resetting force is applied to the relay apparatus. Unlike the relays of the prior art, the present relay is not electrically energized but instead is driven by rotational energy provided by the rotating drive or capstan.

The apparatus of the present invention includes a pivot arm pivotally supported about a pivot axis in axial parallelism with the capstan's axis of rotation, and means normally maintaining the pivot arm in a first position about the pivot axis. A shaft is attached to the pivot arm at a predetermined distance from the pivot axis and in axial parallelism therewith. Gear means is supported about the shaft and, in response to a mechanical control signal which can be automatically applied thereto at a preselected condition of web transport, is urgeable into driving engagement with the capstan for being rotatably driven through a predetermined angle. The gear further includes cam means in cooperative relation with the shaft for urging the pivot arm to a second predetermined position about the pivot axis when the gear is rotatably driven through the predetermined angle.

When the gear is driven through the predetermined angle, the reaction of the cam means causes a sustained force to be applied to the pivot arm, thereby coercing a cooperative device from one position to another. When a resetting force is applied to the shaft for disengaging the gear means from the capstan, the pivot arm is caused to pivot to its normal or first position, and the cooperative device is repositioned to its first position.

In a preferred embodiment of the present invention, the pivot arm is maintained in its first position by means of a spring which biases the shaft toward the capstan, and the shaft includes a pinch roller rotatably positioned thereabout which is normally in web-driving engagement with the capstan while restricting proximity of the shaft to the capstan such that the gear (which is preferably a friction gear) is normally disengaged from the capstan. When the friction gear is urged into driving engagement with the capstan, the consequent pivoting of the pivot arm into its second position causes the pinch roller to be repositioned away from the capstan, thereby disengaging the web from the capstan for stopping web transport. When it is desired to resume web transport, the apparatus of the present invention is reset upon application of a resetting force applied to the pivot arm.

The novel features which are believed to be characteristic of the invention, together with further advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

Figure 1:
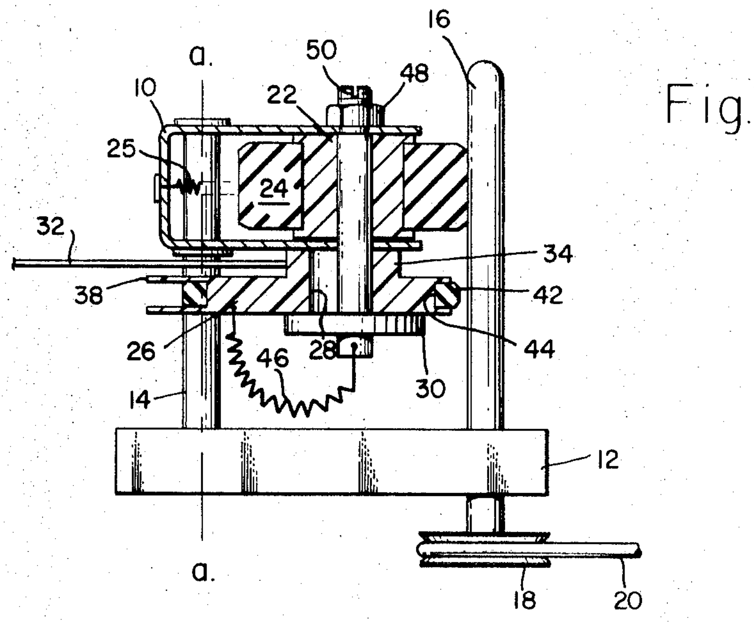
FIG. 1 is a cross-sectional, elevation view of a preferred embodiment of apparatus according to the present invention.
Figure 2:
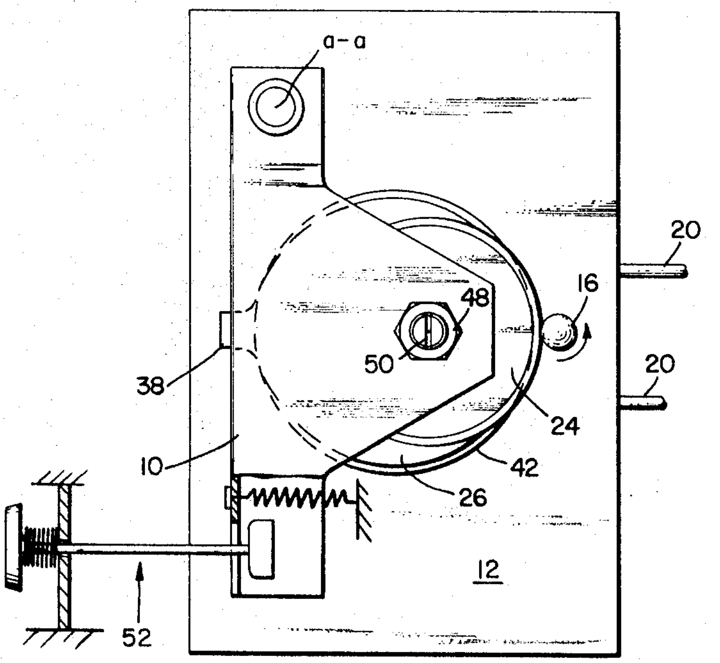
FIG. 2 is a part cutaway, top view of the preferred embodiment of FIG. 1 shown in its normal or first position.

Turning to FIGS. 1 and 2, a pivot arm 10 is pivotally mounted to a support structure 10 about a pivot axis *a–a*, such as by means of a mounting shaft 14. Rotational drive means supplied by a tape transport of a magnetic tape recoding and/or playback, is of a conventional type including, for example, a spindle capstan 16 rotatably driven about its longitudinal axis (situated parallel to the pivot axis *a–a*) by means of a pulley 18 and cable 20 driven by suitable motor means (not shown).

A shaft 22 is carried by the pivot arm 10 in axial parallelism with the spindle 16 and at a predetermined distance from the pivot axis *a–a*. A conventional pinch roller 24 is mounted for free rotation about the shaft 22, and is normally biased into pressure engagement with the rotating spindle 16 by means of a spring 25 attached to the pivot arm 10.

It can be appreciated that the spring 25 biases the shaft 22 toward the spindle 16, while the radius of the pinch roller 24 determines the actual distance of the shaft 22 from the spindle 16 when the pinch roller 24 is in contact with the spindle 16. The pivot arm 10 is therefore maintained in a first position about the pivot axis *a–a*, as shown in FIG. 2.

A friction gear 26 (shown in better detail in FIG. 3) is eccentrically positioned about the shaft 22, by means of an eccentric aperture 28 having a diameter larger than the diameter of the shaft 22. Support means such as a platform 30 (FIG. 1) attached to the shaft 22 is provided for supporting the friction gear 26 and for permitting translational and rotational movement of the friction gear 26 with respect to the shaft 22. It is preferred that the diameter of the eccentric aperture 28 is greater than the diameter of the shaft 22 by a distance slightly greater than the distance between the rim of the friction gear 26 and the spindle 16 when the pivot arm 10 is in its first position, so that the friction-gear 26 can be translationally urged (to the right as shown in FIG. 1) into contact engagement with the spindle 16. This translational movement can occur upon movement of a rod member 32 against a collar 34 in response to an actuating control force longitudinally (to the right as shown in FIG. 1) applied to the rod member 32. Alternatively, the actuating control force can be applied in a manner to rotate the gear 26 until the gear contacts the spindle 16; e.g., the force can be laterally applied to an outwardly extending tab 38.

It can be appreciated that, upon rotation of the friction gear 26, its inner circumference (defining the aperture 28) cams the shaft 22 away from the spindle 16 and about the pivot axis *a–a*. The outside diameter of the friction gear 26 and the degree of eccentricity of the aperture 28 is determined in accordance with the amount of shaft movement about the pivot axis *a–a* desired upon rotation of the friction gear 26 through a predetermined rotational angle.

Figure 3:
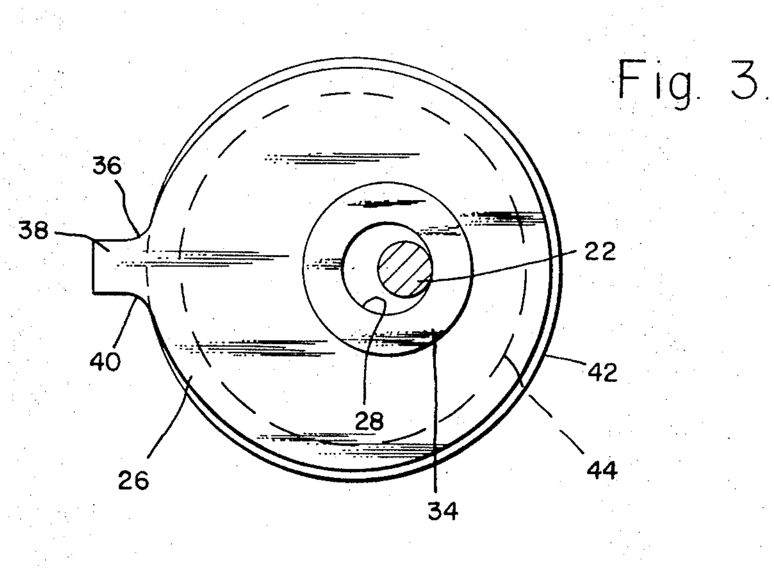
FIG. 3 is top view of an eccentric friction gear shown in the preferred embodiment of FIG. 1.

The friction gear 26 is adapted for rolling friction engagement with the rotating spindle 16 through the predetermined angle, and is further provided with stop means, such as partial bearing 36 positioned to cooperate with the rotating spindle 16 (which functions as journal for the partial bearing 36), for stopping rotation of the gear 26 while still engaging the spindle 16. In one example of a suitable friction gear 26 (shown in FIGS. 1 and 3), the body of the gear 26 was machined from a commercially available plastic material known by the trademark Delrin, to include the outwardly extending tab 38 provided with the partial bearing 36 (as well as a second partial bearing 40 for permitting bidirectional operation of the apparatus). A rubber tire 42 was fitted within a circumferential groove 44, and the tab 38 met the outer circumference of the tire 42 in such manner to effect a smooth transition from the tire 42 to the partial bearings 36, 40, as shown in FIG. 3.

Biasing means such as a spring 46 (FIG. 1) is provided for biasing the friction gear 26 both rotatably and translationally in its normally unactuated position such that the "cam surface" 28 is biased against the shaft 22, preferably at its position of greatest eccentricity. The spring 46 is rigidly attached at its ends to the shaft 22 and to the friction gear 26, and the shaft 22 is constrained from rotation by means of a locking nut 48 which fixedly secures a threaded end of the shaft 22 to the pivot arm 10. The spring force can be adjusted for maintaining the friction gear 26 in its normal position before actuation and for causing the gear 26 to automatically resume this position when reset, by loosening the locking nut 46 and manually rotating the shaft 22 (utilizing a screwdriver slot 48) until the gear 26 is appropriately positioned, whereupon the locking nut 46 is tightened while the shaft 22 is maintained in the adjusted position.

When the apparatus of the present invention is utilized as controlled-speed tape drive, supplied tape (not shown) is interposed between the pinch roller 24 and the spindle capstan 16 for longitudinally driving the tape in a manner conventional to the tape transport art. When it is desired to stop such transport, the rod member 32 is urged against the friction gear collar 34, for translationally moving the friction gear until the tire 42 is in rolling friction engagement with the rotating spindle 16 and rotation of the friction gear 26 has been initiated.

The actuating force applied by the rod member 32 for initiating rotation of the friction gear 26 is ordinarily of small magnitude, since it need merely overcome the biasing force supplied by the spring 46 to cause the friction gear 26 to slide along the platform 30. The actuating force, however, should be applied for a period of time sufficient to assure camming contact between the camming surface 28 and the shaft 22.

The friction gear 26 is thereupon rotatably driven until the spindle 16 is in journal engagement with the partial bearing 36, whereupon gear rotation is automatically terminated. During this rotation, the cam surface 38 cams the shaft 22 away from the spindle 16 (about the pivot axis *a–a*).

Figure 4:
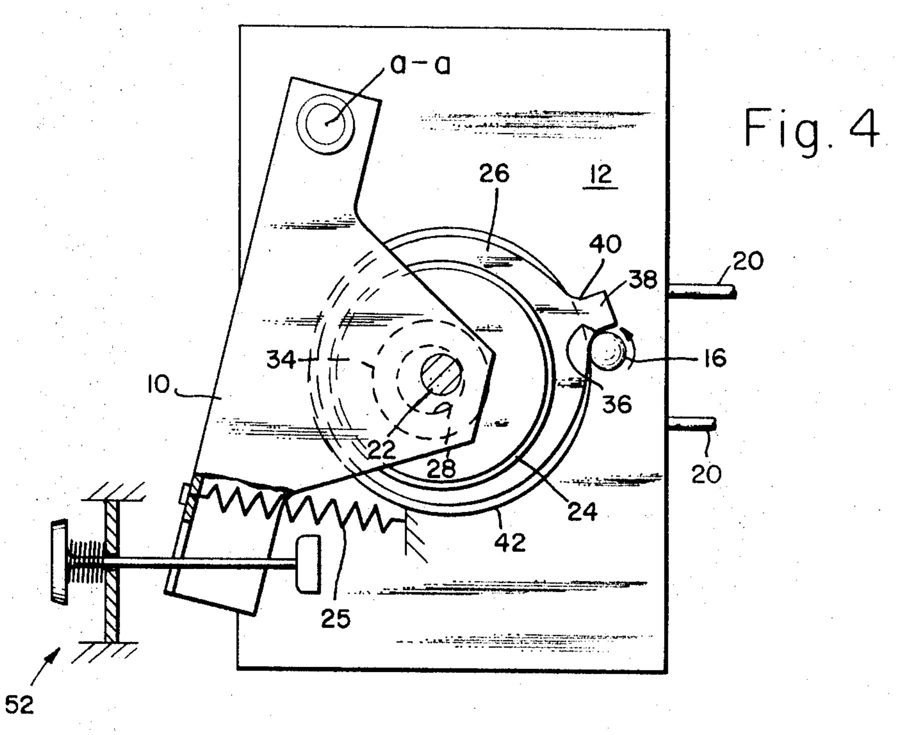
FIG. 4 is a part cutaway, top view of the preferred embodiment of FIG. 1 shown in its second position after actuation.

Accordingly, the apparatus assumes the configuration shown in FIG. 4, wherein the pinch roller 24 (which of course follows the movement of the shaft 22) is retracted from the rotating spindle 16, causing the interposed tape to cease being driven by the spindle 16. Furthermore, this movement of the shaft 22 causes corresponding movement of the pivot arm 10, which assumes a second position about the pivot axis *a–a* against the increased force of the pivot arm spring 25.

When it is desired to reset the apparatus to its normal position, the shaft 22 is urged away from the spindle 16 a sufficient distance to disengage the friction gear 26 from the rotating spindle 16. The adjusted spring force of the spring 46 causes the gear 26 to be rotationally reset to its normal position, and the gear 26 is transversely reset upon release of the resetting force. The resetting force can be applied to the shaft 22 by means of a manually operated reset-actuating means 52 adapted for pulling engagement with the pivot arm 10.

It should be noted that, in the preferred embodiment of the present invention, the pinch roller 24 functions both as the means for restricting proximity of the shaft 22 with respect to the spindle 16, and as the transport device which is to be controlled by the present apparatus. In addition, the sustained force produced by the repositioning of the pivot arm 10 can be utilized to simultaneously remove the drive at the tape takeup reel; this is easily performed by means of a simple linkage connecting the pivot arm 10 and the takeup reel drive.

Other devices can be controlled by the present apparatus, by cooperative coupling to the pivot arm 10 as the pivot arm is moved between its two positions. In such cases, the pinch roller 24 can be omitted from the apparatus, as long as it is replaced by another means for restraining the shaft 22 with respect to the spindle 16 such that the friction gear 26 is normally disengaged from the spindle 16.

One application of the preferred embodiment is in combination with audio tape playback-visual film projector apparatus, where it is desired to stop the audio tape in response to a stopping of the film. For example, in audiovisual training apparatus which includes a projector system for projecting individual frames of a film strip and a tape playback apparatus for providing synchronized narration, it is sometimes desired to project a particular frame for extended periods of time without sound accompaniment. Thus, a live demonstration or a student examination involving the projected picture or writing display can take place during this time period.

In such training apparatus, the intermittent film transport can be provided with means for changing film frames in response to high frequency signals impressed at preselected locations on the audio tape, so that frame changes proceed automatically while the audio tape is being transported past the playback head by the pinch roller/capstan combination 24, 16. In order to stop this process of automatic frame changing and to permit extending projection of particular frames, the preferred embodiment of the present apparatus can be employed for automatically stopping the tape at preselected times corresponding to desired times of extended frame projection.

For example, a finger member (not shown) can be positioned to ride on the edge of the film strip which can include physical indentations at preselected locations. The finger member can be coupled to the rod member 32 (FIG. 1) by means obvious to persons skilled in the mechanical trigger art, such that the rod member 32 is urged against the friction gear collar 34 to trigger gear rotation when the finger member falls into a film strip indention. The ensuing operation of the present apparatus causes the tape to stop.

After extended projection of the film frame, the tape is again caused to be driven by manually pulling the reset rod 52 to reset the present apparatus. Film frame changing thereupon proceeds in response to the high frequency signals produced by the moving tape.

In another application of the present apparatus, a tape rewind device can be controlled by the repositioning of the pivot arm 10. For example, the pivot arm 10 can be coupled to a rewind lever (not shown) of a tape transport, for switching the lever to a rewind position in response to a controlled force generated at a time corresponding to the useful end of the tape supply. The rewind lever is maintained in its rewind position until the apparatus is reset.

Thus, there has been described a preferred embodiment of mechanical relay apparatus which is drivable by a continuously rotating spindle, for controlling operation of various tape transport devices, and in particular for retracting a pinch roller from a capstan to stop transport of an interposed tape. Other embodiments of the present invention, and modifications of the embodiment herein presented, may be developed without departing from the essential characteristics thereof.

Accordingly, the invention should be limited only by the scope of the claims listed below.

What I claim is:

1. In a web transport system including rotational drive means, the combination comprising:
- a pivot arm pivotally supported about a pivot axis;
- means normally maintaining said pivot arm in a first position about said pivot axis; and
- mechanical means coupled to said pivot arm and responsive to an actuating force for being driven by the rotational drive means upon an application of said actuating force, said mechanical means developing a sustained force when driven and applying said sustained force to said pivot arm for pivoting said arm to a second position about said pivot axis and for maintaining said arm in said second position.

The apparatus according to claim 1, above, wherein said mechanical means is responsive to a resetting force, when said pivot arm is in said second position, for resetting said pivot arm to said first position.

3. The apparatus according ro claim 2, above, further including reset-actuating means coupled to said pivot arm for applying said resetting force to said mechanical means.

4. Mechanical relay apparatus comprising the combination of:
- rotational drive means having an axis of rotation;
- a pivot arm pivotally supported about a pivot axis in axial parallelism with said axis of rotation;
- means normally maintaining said pivot arm in a first position about said pivot axis;
- a shaft attached to said pivot arm at a predetermined distance from said pivot axis and in axial parallelism therewith; and
- gear means urgeable into driving engagement with the rotational drive means for being rotatably driven by the drive means through a predetermined rotational angle, said gear means including cam means in cooperative relation with said shaft for urging said pivot arm to a second predetermined position about said pivot axis when said gear means is rotatably driven through said angle.

5. The apparatus according to claim 4, above, wherein said gear means is responsive to a resetting force applied to said shaft, when said pivot arm is in said second position, for resetting said pivot arm to said first position.

6. The apparatus according to claim 5, above, further including reset-actuating means coupled to said pivot arm for applying said resetting force to said shaft.

7. In a tape transport system including a pinch roller and a capstan, apparatus for stopping transport by the capstan when driven of a tape interposed between the capstan and the pinch roller, comprising the combination of:
- a shaft supporting the pinch roller for rotation of the pinch roller about the shaft;
- pivotable means supporting said shaft in axial parallelism with the capstan and normally in a first position whereby the pinch roller is engaged with the capstan; and
- gear means eccentrically positioned with respect to said shaft and translationally urgeable into engagement with the driven capstan for being rotatably driven by the capstan through a predetermined rotational angle, said gear means including cam means in cooperative relation with said shaft for urging said shaft to a second position when said gear means is rotated through said angle whereby the pinch roller is retracted from the capstan.

8. The apparatus according to claim 7, above, wherein said gear means is responsive to a resetting force applied to said shaft for being released from engagement with the driven capstan and for being rotationally and translationally reset with respect to said shaft.

9. The apparatus according to claim 8, above, further including reset-actuating means coupled to said pivotable means for applying said resetting force to said shaft.

10. Mechanical relay apparatus comprising the combination of:
- a spindle adapted to be rotatably driven;
- an arm member pivotable about a pivot axis;
- a shaft secured to said pivot arm in parallelism with said pivot axis;
- a friction gear eccentrically positioned on said shaft and normally responsive to a first translational force applied to said gear toward said spindle for being displaced into engagement with said spindle when driven whereby said gear rotates through a predetermined rotational angle,
- said shaft being displaced from a first position to a second position with respect to said spindle upon rotation of said gear through said angle;
- means maintaining said shaft in said first position before said rotation of said gear means; and
- means responsive to a second translational force applied to said shaft away from said spindle for resetting said shaft to said first position and said gear to be responsive to said first applied force.

11. In a web transport system, the combination comprising:
- a support;
- a pivot arm, pivotally mounted to said support about a pivot axis;
- a spindle for being rotational driven in parallelism with said pivot axis;
- a friction gear for being rotatably driven by said spindle through a predetermined rotational angle when in engagement therewith, said friction gear having an eccentric aperture therein;
- stop means on said friction gear for restraining rotation thereof after said friction gear has been rotatably driven through said angle;
- a shaft having a diameter smaller than said gear aperture and situated therein, said shaft being carried by said pivot arm in parallelism with said spindle and at a predetermined distance from said pivot axis;
- means supporting said friction gear for translational and rotational movement with respect to said shaft;
- first biasing means for biasing said shaft toward said spindle;
- means for restricting proximity of said shaft with respect to said spindle to a predetermined distance;
- second biasing means for biasing said friction gear rotatably and translationally in an unactuated position when said gear is disengaged from said spindle;
- means for translationally moving said friction gear to an actuated position for engaging said spindle; and
- means for disengaging said friction gear from said spindle;
- means for disengaging said friction gear from said spindle.

12. The apparatus according to claim 11, above, wherein said stop means includes a partial bearing for bearing engagement with said driven spindle upon rotation of said friction gear through said angle.

13. The apparatus according to claim 11, above, wherein said means for restricting proximity of said shaft member with respect to said spindle includes a pinch roller rotatably supported by said shaft and in rolling engagement with said driven spindle when said friction gear is in said unactuated position.

UNITED STATES PATENT OFFICE
CERTIFICATE OF CORRECTION

Patent No. 3,589,583 Dated June 29, 1971

Inventor(s) Stanley D. Tout

It is certified that error appears in the above-identified patent and that said Letters Patent are hereby corrected as shown below:

In the Drawing:
Sheet 2 of 2, change the last name of applicant from "Trout" to --Tout--.
In the claims:
Column 5, line 24, before "The apparatus", insert --2.--.
Column 6, delete line 58 in its entirety.

Signed and sealed this 23rd day of January 1973.

(SEAL)
Attest:

EDWARD M.FLETCHER,JR.
Attesting Officer

ROBERT GOTTSCHALK
Commissioner of Patents